Patented Nov. 7, 1944

2,362,070

UNITED STATES PATENT OFFICE 2,362,070

PREPARATION OF ISOCYTOSINE

Martin Everett Hultquist, North Plainfield, N. J., assignor to American Cyanamid Company, New York, N. Y., a corporation of Maine No Drawing. Application May 15, 1941,
Serial No. 393,669

8 Claims. (Cl. 260—251)

This invention relates to an improved process for preparing isocytosine.

Isocytosine was first prepared by Wheeler and Johnson, American Chemical Journal, vol. 29 (1903) page 501, by reaction of sodium ethyl formyl acetate with free guanidine in water solution followed by treatment with sulfuric acid and then ammonia. This resulted in recovering the isocytosine in a highly impure form which required extensive decolorizing, the yields being from 36-39% based on the guanidine and 27% on purified sodium formylacetic ester. There is considerable loss on isolation and purification during the recovery of the sodium formylacetic ester from the reaction mixture in which it is formed.

Recently because of the great commercial importance of isocytosine as an intermediate for the production of 2-sulfanilamido pyrimidine (sulfadiazine) further work has been done in order to improve the Wheeler and Johnson process. This work involved using acid instead of alkaline conditions by treating a mixture of sulfuric acid and formylacetic acid prepared by the reaction of fuming sulfuric acid on malic acid with a guanidine salt. This process gave better yields than that of Wheeler and Johnson and formed the basis of industrial production of sulfadiazine. The improved process is described and claimed in the U. S. patent to Roblin and English No. 2,224,836 dated December 10, 1940.

While a great improvement over the Wheeler and Johnson process, the Roblin and English process still leaves something to be desired. In the first place, the yields are not as high as is desirable, and in the second place, the acid medium is corrosive and requires refractory equipment which increases to a very considerable degree the plant cost.

The present invention is an improvement on the alkaline method of Wheeler and Johnson. Essentially the main difference is that the present invention instead of preparing free guanidine, reacts sodium formyl acetic esters with a mixture of a guanidine salt such as guanidine nitrate and caustic alkali thus producing nascent guanidine which appears to be much more reactive and permits obtaining better yields.

In the present process the sodium formyl acetic ester is not isolated but the reactants, formic esters, acetic esters, and sodium alcoholate are simply mixed together, permitted to react at room temperature, and the crude mixture reacted with the guanidine salt and caustic alkali above referred to. The difficulties encountered in isolating sodium formyl acetic ester are entirely avoided. A further factor of importance is the relatively low cost of the primary raw materials for forming the formyl acetic ester as compared with malic acid which is used in the Roblin and English process.

A further feature is that crude isocytosine is recovered in the form of its sodium salt by cooling the solution. A much purer product in improved yield is thereby obtained.

Still a further feature which is preferred but is not as important is the use of a solvent, preferably a lower molecular weight alcoholic by-product of the reaction forming the sodium formyl acetic ester.

The improvements of the present invention result in an enormous increase in yields. Wheeler and Johnson's 36-39% is raised to 60-70%, almost double, and the procedure is greatly simplified using equipment which does not have to be made of strongly refractory material as the corrosion problem is practically non-existent. Very material savings in the cost of isocytosine and hence in the cost of sulfadiazine are thus obtained.

The present invention will be described in greater detail in conjunction with the following specific examples which are typical illustrations. The parts are by weight.

Example 1

To a mixture of 37 parts of ethyl formate and 48.5 parts of ethyl acetate (in the form of 86% ethyl acetate containing approximately 14% ethyl alcohol) was added 32.5 parts of powdered sodium methylate over 20 minutes at 5-10° C. with stirring and cooling. The resulting thin paste was stirred for an hour at 10° C. and was then allowed to stand at 25-30° C. for 18 hours. To the resulting slurry was added 40 parts of guanidine nitrate, 25 parts of ice and 30 parts of 50% sodium hydroxide. After three hours standing with occasional stirring, the solution was cooled to 10° C. and the crystalline sodium salt of isocytosine was filtered off. This sodium salt of isocytosine was then dissolved in 50 parts of hot water and the isocytosine was precipitated by adding hydrochloride acid to a pH of 7.5-8. The yield of isocytosine melting at 280-282° C. obtained on cooling, filtering, washing and drying, was 65.3% of theory based on the guanidine nitrate used.

Example 2

Twenty-two parts of powdered sodium methylate was added to a mixture of 51 parts of ethyl acetate and 37 parts of ethyl formate with stirring and cooling to −15 to −20° C. This required twenty minutes. The resulting pasty mass was stirred for thirty minutes at −20° C. and was then allowed to stand at +25 to +30° C. for 18 hours. To this was then added 35 parts of guanidine nitrate, 100 parts of water and 30 parts of 50% sodium hydroxide. After three hours standing with occasional stirring, this solution was neutralized to a pH of 10–11 with hydrochloric acid, decolorizing carbon was added, and the solution was filtered at 75° C. The filtrate was neutralized with hydrochloric acid to a pH of 7.5–8, and the solution cooled to 10° C. to crystallize. The yield of isocytosine obtained on filtering, washing and drying was 60% of theory, based on the guanidine nitrate used.

*Example 3*

To a mixture of 85 parts of methyl acetate and 74 parts of ethyl formate, 54 parts of powdered sodium ethylate was added with stirring and cooling so as to hold the temperature below 10° C. The temperature was allowed to rise to 25–30° C. after one hour and the mixture then allowed to stand 16 hours. 80 parts of guanidine nitrate, 50 parts of ice and 60 parts of 50% sodium hydroxide solution was then added with some further cooling to keep the temperature from rising over 50° C. The mixture was stirred at 30° C. for three hours, cooled then to 10° C., and the sodium salt of isocytosine filtered off, dissolved in 100 parts of hot water and neutralized with hydrochloric acid to a pH of 7.5–8. On cooling to 15° C., filtering, washing, and drying, 45 parts of isocytosine were obtained or 62% of theory based on the guanidine nitrate.

*Example 4*

As in Example 3 using 60 parts of methyl formate and 115 parts of 86% ethyl acetate in place of methyl acetate and ethyl formate, a corresponding reaction was carried out. The yield of isocytosine was 41.5 parts or 57% of theory based on the guanidine nitrate. This yield while somewhat lower is of economic advantage because of the much lower price of methyl formate as compared with ethyl formate.

In the examples sodium methylate and sodium hydroxide are used as these are the cheapest alkali metal alkoxides and alkali metal hydroxides respectively. It should be understood, however, that the invention is not limited thereto, similar results being obtained by the corresponding potassium compounds although these are less desirable economically because of their somewhat higher price. Other salts of guanidine than the nitrate may be substituted such as the hydrochloride, sulfate, and the like. Guanidine nitrate is produced in enormous quantities as a commercial article and is the cheapest of the guanidine salts. Since it acts with the same efficiency as the higher priced salts it is therefore preferable from a practical standpoint.

What I claim is:

1. A method of producing isocytosine which comprises mixing an alkali metal formylacetic ester, a guanidine salt and an alkali metal hydroxide together and reacting said compounds under such conditions so as to produce isocytosine and separating the isocytosine formed.

2. A method of preparing isocytosine which comprises mixing an ester of formic acid, an ester of acetic acid and an alkali metal alkoxide to form alkali metal formylacetic ester and adding to said reaction mixture a guanidine salt and then adding an alkali metal hydroxide and reacting said compounds under such conditions so as to form isocytosine and separating the isocytosine.

3. A method of preparing isocytosine which comprises mixing an ester of formic acid, an ester of acetic acid and an alkali metal alkoxide to form alkali metal formylacetic ester and adding to said reaction mixture a guanidine salt and then adding an alkali metal hydroxide and reacting said compounds under such conditions so as to form isocytosine, cooling the reaction mixture and recovering the alkali metal salt of isocytosine by crystallizing it out from the cool solution.

4. A method according to claim 1 in which the reaction is carried out in an alcoholic organic solvent.

5. A method according to claim 3 in which the reaction is carried out in an alcoholic organic solvent.

6. A method according to claim 1 in which the guanidine salt is guanidine nitrate.

7. A method according to claim 2 in which the ester of formic acid is methyl formate.

8. A method according to claim 3 in which the ester of formic acid is methyl formate.

MARTIN EVERETT HULTQUIST.